(12) United States Patent
Chelaidite (10) Patent No.: US 8,794,396 B2
(45) Date of Patent: Aug. 5, 2014

(54) SEAL GROOVE WITH A PROJECTION

(75) Inventor: Galus Chelaidite, South Lyon, MI (US)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 13/252,322

(22) Filed: Oct. 4, 2011

(65) Prior Publication Data

US 2013/0081910 A1    Apr. 4, 2013

(51) Int. Cl.
*F16D 55/18* (2006.01)
*F16J 9/12* (2006.01)
*F16J 15/00* (2006.01)

(52) U.S. Cl.
USPC ........... 188/72.4; 277/452; 277/455; 277/587

(58) Field of Classification Search
USPC .................. 188/71.8, 72.3, 72.4, 370, 196 P, 188/322.16, 322.18; 277/641, 642, 650, 277/626, 944, 437, 452, 453, 455, 579–580, 277/587
See application file for complete search history.

(56) References Cited

U.S. PATENT DOCUMENTS

| | | | |
|---|---|---|---|
| 3,563,442 A * | 2/1971 | Kretchman | 277/438 |
| 3,915,461 A | 10/1975 | Gautier | |
| 4,387,901 A * | 6/1983 | Ritsema | 277/584 |
| 5,076,593 A * | 12/1991 | Sullivan et al. | 277/565 |
| 5,325,940 A | 7/1994 | Rueckert et al. | |
| 5,826,681 A * | 10/1998 | Kubo et al. | 188/71.8 |
| 6,044,936 A * | 4/2000 | Matsumoto et al. | 188/72.4 |
| 6,244,393 B1 | 6/2001 | Weidenweber et al. | |
| 7,097,004 B2 | 8/2006 | Barrett et al. | |
| 7,191,875 B2 * | 3/2007 | Kurimoto et al. | 188/72.4 |
| 7,255,207 B2 * | 8/2007 | Noguchi et al. | 188/72.4 |
| 2005/0173215 A1 * | 8/2005 | Watarai et al. | 188/370 |
| 2007/0256903 A1 | 11/2007 | Noguchi et al. | |
| 2008/0105501 A1 * | 5/2008 | Kubic et al. | 188/72.4 |
| 2009/0272606 A1 | 11/2009 | Chelaidite et al. | |

FOREIGN PATENT DOCUMENTS

| | | |
|---|---|---|
| DE | 3241164 A1 | 5/1984 |
| DE | 4202927 A1 | 8/1993 |
| DE | 19644552 A1 | 4/1998 |
| DE | 69605875 T2 | 8/2000 |
| DE | 60108925 T2 | 12/2005 |
| EP | 0088689 A1 | 9/1983 |
| EP | 1561679 A1 | 8/2005 |
| GB | 2129878 A | 5/1984 |
| WO | 00/09916 A1 | 2/2000 |

OTHER PUBLICATIONS

Co-pending U.S. Appl. No. 12/906,470, filed Oct. 18, 2010.

* cited by examiner

*Primary Examiner* — Vishal Sahni
(74) *Attorney, Agent, or Firm* — The Dobrusin Law Firm, P.C.

(57) ABSTRACT

A caliper comprising: a piston bore and a seal groove located in the piston bore proximate to an open end of the piston bore, the seal groove comprising: a front wall; a rear wall; a bottom wall spanning between and connecting the front wall to the rear wall; a projection in a central region of the bottom wall suitable for allowing twisting of a seal during a brake retract and/or brake release; wherein the rear wall diverges away from the front wall as the rear wall extends away from the bottom wall and towards the bore surface.

19 Claims, 4 Drawing Sheets

SEAL GROOVE WITH A PROJECTION

FIELD

The present teachings generally relate to an improved seal groove, which generates a reduced air gap while maintaining low brake drag.

BACKGROUND

The present teachings are predicated upon providing an improved disc brake system and caliper for use with vehicles. For example, the caliper may be used with almost any vehicle (e.g. car, truck, bus, train, airplane, or the like). Alternatively, the caliper may be integrated into assemblies used for manufacturing or other equipment that require a brake such as a lathe, winder for paper products or cloth, amusement park rides, or the like. However, the present invention is most suitable for use with a passenger vehicle (i.e. a car, truck, sports utility vehicle, or the like).

Generally, a braking system includes a rotor, a caliper body, a support bracket, an inboard brake pad, and an outboard brake pad located on opposing sides of the rotor. The caliper body further includes a bridge, one or more fingers, and a piston bore. The piston bore houses a piston. The bore has a bore axis that the piston moves along during a brake apply and a brake release. The piston axis may be substantially parallel to the bore axis. Preferably, the piston axis is parallel to and moves along the bore axis. The piston bore may include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad. However, during a pressure apply the piston may be pushed by a mechanical force instead of a fluid pressure. For example, during a brake apply, a mechanical actuator may push the piston into contact with the brake pads. Preferably, the piston is pushed by a fluid. More preferably, the piston is pushed by brake fluid.

Generally, when a brake apply is completed (i.e. released) the seal assists in moving the piston axially away from the brake pad; thus, creating an air gap. Upon a subsequent brake apply, the piston is forced into contact with the brake pad and then moves the brake pad into contact with the rotor, thus, eliminating the air gap. Moving the piston and brake pad to eliminate the air gap takes time, thus, there is a tag time between the beginning of a brake apply and when a braking force is created. This lag time lengthens stopping distance and/or running time. Examples of such braking devices are disclosed in U.S. Pat. Nos. 3,915,461 and 7,191,875; Great Britain Patent No. GB2129878; and WO00/09916 all of which are expressly incorporated herein by reference for all purposes. What is needed is a braking system that improves braking performance without decreasing fuel efficiency or increasing brake pad and rotor wear. What is needed is a braking system that minimizes or substantially eliminates air gap without adversely affecting: the life of the brake pads, the rotor, fuel economy, or a combination thereof. What is further needed is a braking system that reduces the amount of time between the beginning of a brake apply and when a braking force is created.

SUMMARY

One possible embodiment of the present teachings include: a seal groove comprising: a front wall perpendicular to a bore axis of the seal groove; a rear wall; a bottom wall spanning between and connecting the front wall to the rear wall; a projection in a central region of the bottom wall suitable for allowing twisting of a seal during a brake retract and/or a brake release; wherein the rear wall diverges away from the front wall as the rear wall extends away from the bottom wall and towards the bore surface.

One possible embodiment of the present teachings include: a caliper comprising: a piston bore and a seal groove located in the piston bore proximate to an open end of the piston bore, the seal groove comprising: a front wall perpendicular to a bore axis of the seal groove; a rear wall; a bottom wall spanning between and connecting the front wall to the rear wall; a projection in a central region of the bottom wall suitable for allowing twisting of a seal during a brake retract and/or a brake release; wherein the rear wall diverges away from the front wall as the rear wall extends away from the bottom wall.

Another unique aspect of the present teachings envisions a disc brake comprising: an inboard brake pad and an outboard brake pad; a rotor located between the inboard brake pad and the outboard brake pad; a caliper with a piston bore, the piston bore including a seal groove comprising: a front wall perpendicular to a bore axis of the seal groove; a rear wall; a bottom wall spanning between and connecting the front wall to the rear wall; a projection in a central region of the bottom wall suitable for allowing twisting of a seal during a brake retract and/or a brake release; wherein the rear wall diverges away from the front wall as the rear wall extends away from the bottom wall; a piston located in the piston bore; and a seal located in the seal groove; wherein an inner diameter of the seal is in contact with the piston, and the piston remains substantially in contact with the inboard brake pad during the brake off position.

The teachings herein surprisingly solve one or more of these problems by providing a braking device that includes a caliper with a seal groove and a seal located in the seal groove, which reduces and/or eliminates air gap without adversely increasing friction force between the brake pads and the rotor. The present seal and seal groove further retain brake fluid while reducing the axial force created by the seal on the piston when the piston is in a brake off position (i.e. running). The seal groove structure retains the seal so that the seal does not axially shift along the bottom wall of the seal groove during a brake apply, a brake retract and/or a brake release, or a position therebetween, but allows the seal to twist within the seal groove. The seal groove structure includes a projection that is shaped so that the seal twists within the seal groove, thus, reducing the amount of axial force exerted on the piston by the seal, after a brake apply is complete, so that the piston and/or brake fluid do not apply any substantial pressure on the brake pad and/or rotor during running (i.e. brake off).

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

A caliper includes a bridge, fingers, and a piston bore. The piston bore includes a closed end, an open end, and a seal groove proximate to the open end. The seal groove includes a front wall proximate to the brake pads, a rear wall located between the closed end side of the piston bore and the front wall, and a bottom wall spanning between and connecting the front wall and the rear wall. The seal groove, preferably, is one continuous surface or contoured line, when viewed in the cross-section that includes a front wall portion, a bottom wall portion, and rear wall portion. The rear wall portion and the bottom wall portion are integrally connected in a rearward recessed region, and the front wall portion and the bottom wall portion are integrally connected in a forward recessed region. The front wall, rear wall, and bottom wall are discussed individually herein for ease of discussion; however, these components form one continuous contoured line, contour, or both when viewed from the cross-section. The front wall may form any angle so that the seal is retained within the seal groove during a brake apply. The front wall may form any angle so that the seal twists in the seal groove during a brake apply, a brake retract, a brake release, any time therebetween, or a combination thereof and remains twisted in a brake off position. The front wall may be any angle so that a small air gap is created after a low pressure brake apply. A high pressure brake apply as discussed herein is a brake apply of more than about 7 MPa, about 10 MPa or more, or about 12 MPa or more (i.e., between about 7 MPa and about 14 MPa). A low brake apply as discussed herein is any brake apply of less than about 4 MPa or about 2 MPa or less (i.e., between about 1 MPa and about 4 MPa). A medium brake apply as discussed herein is any brake apply with a force of between about 4 MPa and about 7 MPa. The front wall may form an angle with the piston, the bore axis, or both.

The front wall may form an angle with the bottom wall. The front wall may form an angle of about 84 degrees or more, about 85.5 degrees or more, about 87 degrees or more, or even about 89 degrees or more with the bore axis. The front wall may form an angle with a line that is perpendicular to the bore axis. The front wall may form an angle of about 1 degree or more, about 2 degrees or more, about 3 degrees or more, or about 4 degrees or more with the line perpendicular to the bore axis. The front wall may form an angle of about 10 degrees or less, about 8 degrees or less, or about 5 degrees or less (i.e. about 4.5 degrees) with a line that is perpendicular to the bore axis. The front wall is substantially at a right angle with the piston, the bore axis, the bottom wall, or a combination thereof. The front wall may form a right angle with a plane of the bottom wall, the piston, the bore axis, or a combination thereof. The front wall may form an angle between about 0 degrees and about 5 degrees with a line perpendicular to the bore axis. The front wall may be free of chamfers.

The front wall may include a chamfer. The front wall may include one or more chamfers. The front wall may include any chamfer configuration as disclosed in the teachings herein including those of U.S. Patent Application Publication No. 2009/0272606, filed on May 2, 2008, incorporated by reference herein. The front wall may be parallel to a rear wall. Preferably, the front wall and the rear wall are not parallel. For example, an intersection point exists between two lines extended collinearly, one with the front wall, the other with the rear wall.

The rear wall may form any angle so that a seal is retained within the seal groove during a brake off, a brake apply, a brake release, any time therebetween, or a combination thereof. The rear wall may form any angle so that during a brake release the seal is allowed to twist within the seal groove. Preferably, the angle of the rear wall is any angle so that the seal is allowed to twist within the seal groove so that the piston is substantially free of retraction away from the brake pad and/or rotor. More preferably, the angle of the rear wall is any angle so that the seal is allowed to twist away the front wall and into the area and/or volume created by the angle of the rear wall from a line perpendicular to the bore axis so that the piston is substantially free of retraction away from the brake pad. The angle of the rear wall may be any angle so that the seal is allowed to twist away from the front wall, due to the piston being forced into the piston bore by the relaxation of the brake pads, release of deflection of the caliper body, or both, so that the piston is free of retraction away from the brake pad and the piston maintains a force, in the apply direction, on the brake pad that is substantially reduced when compared to a force on the piston in the apply direction created by a seal in a standard seal groove (e.g., the bottom wall is at a slight angle to the bore axis; see for example, U.S. Pat. Nos. 5,826,681; 6,244,393; or 7,191,875). The force of the piston on the brake pads in the apply direction during running, due to the twist of the seal, may be about 25 N or less, about 20 N or less, about 15 N or less, preferably about 10 N or less, more preferably about 8 N or less, even more preferably about 5 N or less, or most preferably about 2 N or less. The force of the piston on the brake pads in the apply direction during running, due to the twist of the seal, may be about 0.5 N or more, about 1 N or more, or about 1.5 N or more. The force of the piston on the brake pads in the apply direction during running, due to the twist of the seal may be between about 20 N and about 1 N and preferably between about 10 N and about 2 N.

The angle of the rear wall may be any angle so that the seal may twist into the area and/or volume created by the angle of the rear wall. The angle of the rear wall may be any angle so that a minimum contact area is created between the rear wall and the seal, when the seal is in a twisted condition. The angle of the rear wall may be any angle so that the amount of surface area of the seal that is in contact with the rear wall is minimized when the seal is in a twisted condition, an untwisted condition, or any condition therebetween. The angle of the rear wall may be any angle so that contact between the seal and the rear wall is substantially limited when the seal is in a twisted condition, an untwisted condition, or any condition therebetween. The rear wall may form an angle with a plane of the bottom wall. The rear wall may form an angle with the bore axis. Preferably, the rear wall may form an acute angle with the piston axis, bore axis, or both. More preferably, as the rear wall extends from the bottom wall towards the bore axis, the rear wall diverges away from the front wall. The rear wall may form an angle of about 5 degrees or greater, about 10 degrees or greater, preferably about 15 degrees or greater, or more preferably about 20 degrees or greater with a line perpendicular to the bore axis. The rear wall may form an angle of about 60 degrees or less, about 50 degrees or less, or about 40 degrees or less with a line perpendicular to the bore axis. The rear wall may form an angle of between about 10 degrees and 35 degrees with a line perpendicular to the bore axis. The rear wall may form an angle with the piston. The rear wall may form an angle with the bore axis. Preferably, the rear wall forms an acute angle with the piston axis, the bore axis, or both. The rear wall may form an angle of about 90 degrees or less, about 85 degrees or less, about 80 degrees or less, about 75 degrees or less, or about 70 degrees or less with the piston, the bore axis, or both. The rear wall may form an angle of about 45 degrees or more, about 55 degrees or more, about 60 degrees or more, or about 65 degrees or more with the piston, the bore axis, or both. The rear wall may be free of chamfers. The rear wall may include a chamfer. The rear wall may include one or more chamfers. The rear wall may include any chamfer configuration as disclosed in the teachings herein including those of U.S. Patent Application Publication No. 2009/0272606, filed on May 2, 2008, incorporated by reference herein.

The bottom wall includes a projection, a forward recessed region, and a rearward recessed region. The projection may be of any size and shape so that the seal is allowed to twist within the seal groove. The projection may be of any size and shape so that a highest point of the projection coincides with a central region in the width of the seal so that the seal can rotate about the projection, (i.e. twists) during a brake release, a brake apply, or both. The projection may be of any size and shape so that seal twist force is minimized without affecting the seal's ability to prevent fluid leakage and piston knockback. Preferably, the projection is located in a central region of the bottom wall. More preferably the projection is a generally arcuate projection that begins at a forward region and extends through the central region and ends at a rear region. The projection may form a bell curve shape. Preferably, the projection is convex. The projection may form a point. The projection may form a peak. The projection may include a top. The top of the projection may be any shape so that the seal is allowed to twist within the seal groove during a brake apply, a brake release, or any time therebetween. The top of the projection may be flat. The top of the projection may have a flat portion. Preferably, the top of the projection may be round or arcuate. The projection may be shaped like a hump. The projection may be radial (i.e. generally circular). The projection may be a shape so that the regions surrounding the projection are free of trapped air pockets so that during a brake apply the air does not have to be compressed and/or be displaced by brake fluid. The projection may be free of any sharp transitions, angles, edges, or a combination thereof. The projection may be free of any peaks created by substantially straight lines that intersect forming a peak. The projection may be free of straight lines. The projection may be free of any linear portions. A side may have at least one linear portion along its length. Both sides may each have at least one linear portion along their lengths. The top of the projection may be located at a depth of about 2.0 mm or more, about 2.2 mm or more, about 2.3 mm, about 2.4 mm or more, or even about 2.45 mm or more from the bore surface, the outer surface of the piston closest to the seal groove, or both. The top of the projection may be located at a depth of about 3.5 mm or less, about 3.0 mm or less, about 2.8 mm or less, or about 2.6 mm or less from the bore surface, the outer surface of the piston closest to the seal groove, or both. The top of the projection may be located at a depth of between about 2.4 mm to about 2.6 mm, preferably about 2.45 and about 2.55 mm from the bore surface, the outer surface of the piston closest to the seal groove, or both. The bottom wall at the forward region and the rearward region may be located about 2.5 mm or more, about 2.6 mm or more, about 2.7 mm or more, about 2.8 mm or more, about 2.9 mm or more, about 3.0 mm or more, or even about 3.2 mm or more from the bore surface, the outer surface of the piston closest to the seal groove, or both. The bottom wall at the forward region and the rearward region may be located about 4 mm or less, about 3.8 mm or less, about 3.6 mm or less, or about 3.5 mm or less more from the bore surface, the outer surface of the piston closest to the seal groove, or both. The distance from the bore surface, the outer surface of the piston closest to the seal groove, or both to the bottom wall in the forward region may be the same as the distance from the bore surface, the outer surface of the piston closest to the seal groove, or both to the bottom wall in the rearward region. The distance from the bore surface, the outer surface of the piston closest to the seal groove, or both to the bottom wall may be different than the distance from bore surface, the outer surface of the piston closest to the seal groove, or both to the bottom wall in the rearward region. The bottom wall in the forward region and the rearward region may be located any of the distances recited herein. Preferably, the distance from the bottom wall to the bore surface, the outer surface of the piston closest to the seal groove, or both in the forward region may be about 2.7 mm to about 3.0 mm and the distance from the bottom wall to the bore surface, the outer surface of the piston closest to the seal groove, or both in the rearward region may be about 2.7 to about 3.5 mm. The projection may have sides.

The sides of the projection may be substantially even (i.e., the region on both sides of the peak when the projection is bisected through its center). For example, the angle and length of the sides of the projection may be substantially similar. The sides of the projection may be symmetrical. The sides of the projection may be asymmetrical. Preferably, the sides of the projection are different. For example, one side may be longer than the other side; one side may have a steeper angle; one side may have a flatter angle; or a combination thereof than the other side. The sides of the projection may contoured (i.e. generally non-linear). Both sides may be free of a linear portion along their lengths. The projection may only be located in the central region of the bottom wall. Preferably, at least a portion of the projection extends to and terminates at a point tangential to a forward region, a rear region, or both.

The bottom wall may be located in one plane. The bottom wall may be located in multiple planes. The bottom wall may be a continuous curve. The bottom wall may have a plane that extends substantially parallel to the bore axis and is located at the highest point of the projection (i.e., a peak plane). The bottom wall may have a peak plane that extends parallel to the bore axis through a point at the top of the projection. The peak plane may be tangential to a point at the top of the projection, and the peak plane may be parallel to the bore axis. The bottom wall may have a plane that extends substantially parallel to the bore axis and is located at the bottom of the forward recessed region (i.e., the forward plane). The bottom wall may have a forward plane that extends parallel to the bore axis through a point at the bottom of the forward recessed region. The forward plane may be tangential to a point at the bottom of the forward recessed region, and the forward plane may be parallel to the bore axis. The bottom wall may have a plane that extends substantially parallel to the bore axis and is located at the bottom of the rear recessed region (i.e. rear plane). The bottom wall may have a rear plane that extends parallel to the bore axis through a point at the bottom of the rear recessed region. The rear plane may be tangential to a point at the bottom of the rear recessed region, and the rear plane may be parallel to the bore axis. The forward plane and the rear plane may overlap (i.e. located on the same plane). The forward plane and the rear plane may be equidistant from the bore axis. The forward plane may be located a greater distance from the bore axis than the rear plane (i.e. the forward plane may be located below the rear plane). Preferably, the forward plane may be located a shorter distance from the bore axis than the rear plane (i.e. the forward plane is located above the rear plane). More preferably, the peak plane may be located at a distance closest to the bore axis (i.e. the peak plane is located above both the forward plane and the rear plane).

The slope and/or angle of the bottom wall may be measured using one or more lines tangent to points along the bottom wall that may form an angle with a the bore axis, may be used to measure the maximum slope of a projection, may be used to measure a minimum slope of the projection, or a combination thereof. The one or more lines tangent to the sides of the projection may form angles with the bore axis. Preferably, one tangent line passing through a point in each side of the projection may be used to measure the maximum and/or minimum slope of each side of the projection. For example, the projection may be bisected by a line passing through the peak, forming a segment on both sides of the line. A tangent line may be placed on each segment so that the lines intersect at the bisecting line. The at which the tangent line is measured may be moved along the length of the projection until the maximum and/or minimum slope of the respective segments is obtained. The angle of the tangent lines that represent the maximum and/or minimum slope, relative to the bore axis may be measured so that a maximum and/or minimum angle of the segment may be obtained. A line tangent to the segment on the forward side of the projection may have the same angle with the bore axis as the line tangent to the segment on the rear side of the projection, when the slope is an absolute value. A line tangent to the segment on the forward side of the projection may have a different angle with the bore axis as the line tangent to the segment on the rear side of the projection. The line tangent to a segment of the projection may form a and/or minimum angle of about a 75 degrees or more, about 80 degrees or more, or about an 85 degrees or more with the bore axis. The line tangent to a segment of the projection may form a maximum and/or minimum angle of about 150 degrees or less, about 135 degrees or less, about 115 degrees or less, or about 95 degrees or less with the bore axis.

The bottom wall, due to its contour, may have multiple lines tangent to the contour of the bottom wall that form multiple different angles with the bore axis. Thus, lines tangent to points along the segment on the front wall side of the projection may have different angles that range from about 5 degrees to about 75 degrees with the bore axis. Lines tangent to points along the segment on the rear wall side of the projection may have different angles range from about 25 degrees to about 85 degrees.

The lines tangent to the segment on the front wall side of the projection, on the rear wall side of the projection, or both have a slope. All of the slopes discussed herein are considered to be absolute values. For example, a negative 1 and a positive 1 are recited as 1. The tangent line on the front wall side of the projection may have a positive slope. The tangent line on the rear wall side of the projection may have a negative slope. The tangent line on the front wall side of the projection may have any slope so that the seal twists within the seal groove. The tangent line on the rear wall side of the projection may have any slope so that the seal twists within the seal groove. The tangent line on the front wall side of the projection may have a maximum and/or minimum slope of about 0.1 or more, about 0.2 or more, about 0.25 or more. The tangent line on the front wall side of the projection may have a maximum and/or minimum slope of about 15 or less, about 12 or less, about 5 or less, preferably about 1.5 or less, more preferably about 1.0 or less, or even more preferably about 0.75 or less. The tangent line on the front wall side of the projection may have a maximum and/or minimum slope between about 0.2 and 1.0 and preferably between about 0.25 and about 0.5. The tangent line on the rear wall side of the projection may have a maximum and/or minimum slope, of about 0.3 or more, about 0.5 or more, or about 0.7 or more. The tangent line on the rear wall side of the projection may have a maximum and/or minimum slope of about 15 or less, about 12 or less, about 10 or less, about 5 or less, preferably about 2.0 or less, more preferably about 1.5 or less, or even more preferably about 1.0 or less. The tangent line on the front wall side of the projection may have a maximum and/or minimum slope between about 0.5 and about 10, preferably between about 0.6 and about 5, or more preferably between about 0.7 and about 2.0.

The bottom wall includes a forward region. The forward region may include a recess forming a forward recessed region. The front wall and the bottom wall connect in the forward region. The forward region may include a radius (i.e., a fillet) which connects the front wall and the bottom wall. The forward region may be a curve which terminates at a point that is tangential to both the forward wall and the forward region.

The forward region may form an arcuate recess so that the seal may extend down and into the recess during a brake apply, a brake retract, a brake release, or a combination thereof. The forward region may be any size and shape so that the seal twists toward the front wall during a brake apply and away from the front wall during a brake retract and/or a brake release. The forward region may include a depth. The depth of the forward region may be any depth so that the forward region is lower than all or a portion of the projection when measured from the piston, the bore axis, or both. Preferably, the depth of the forward region may be any depth so that the forward region is at a distance greater than the highest point of the projection when measured from the piston, the bore axis, or both.

The seal groove includes a rear region. The rear region may include a recess forming a rear recessed region. The rear wall and the bottom wall connect in the rear region. The bottom wall may form a right angle with the rear wall in the rear region. The bottom wall may have an arcuate connection in the rear region. The bottom wall may be an arcuate ninety degree angle (i.e. the bottom wall curves at a ninety degree angle and connects to the front wall.

The rear region may form an arcuate recess so that the seal may extend down and into the recess during a brake apply, a brake retract, a brake release, or a combination thereof. The rear region may be any size and shape so that the seal is allowed to twist away from the front wall during a brake release and away from the rear wall during a brake apply. The rear region may include a depth. The depth of the rear region may be any depth so that the rear region is deeper than all or a portion of the projection when measured from the piston, the bore axis, or both. Preferably, the depth of the rear region may be any depth so that the rear region is lower than the highest point of the projection when measured from the piston, the bore axis, or both. The depth of the rear region may be any depth so that the seal twists into the rear region and the piston is substantially free of retraction (i.e. no air gap) away from the brake pad, the rotor, or both, due to movement of the seal. The inboard brake pad and the outboard brake pad remain substantially proximate to the rotor during the brake off position The bottom wall may include a ramp. The ramp may be located anywhere along the bottom wall. Preferably, the ramp may be located in a forward recessed region, a rear recessed region, or both. More preferably, the ramp may be located in the rear recessed region and extend from the bottom wall to the rear wall forming a linear surface between the rear wall and the bottom wall. The ramp may be of any shape and size so that the ramp contacts a corner of a seal that is installed in the seal groove. Preferably, the ramp contacts a bottom corner of the seal. The ramp may be of any size and shape so that the ramp reduces and/or minimizes the surface area of the seal that contacts the front wall, the rear wall, or both. The ramp may be of any size and shape so that the ramp forms a single point of contact, in the cross-section, with the seal. The ramp may be linear. The ramp may be generally linear. The ramp may be arcuate. The ramp may include an arcuate portion. The ramp may include a linear portion. The ramp may form an angle with the rear wall and/or front wall. The angle between the ramp and the front wall and/or rear wall may be about 90 degrees or greater, about 95 degrees or greater, about 100 degrees or greater, about 105 degrees or greater, about 115 degrees or greater, or about 125 degrees or greater. The angle between the ramp and the front wall and/or rear wall may be about 160 degrees or less, about 150 degrees or less or about 140 degrees or less. Preferably, the angle between the ramp and the front wall and/or rear wall may be between about 95 degrees and about 135 degrees. The ramp may be at angle with the bore axis (i.e., a line that extends collinearly along the ramp to the bore axis and forms an angle). The ramp may form an angle with the bore axis of about 5 degrees or more, about 15 degrees or more, about 20 degrees or more, about 25 degrees or more, or preferably about 30 degrees or more. The ramp may form an angle with the bore axis of about 75 degrees or less, about 60 degrees or less, about 50 degrees or less, about 45 degrees or less, or preferably about 40 degrees or less. The ramp may form an angle with the bore axis of between about 15 degrees or about 60 degrees and preferably between about 25 degrees and about 50 degrees (e.g., about 35 degrees).

The seal groove and seal include an area when viewed from the cross-section, and a volume when viewed as a whole. As discussed herein area of the seal groove and/or seal will be used for ease of discussion, but one skilled in the art will understand that the discussion of area can be converted into a volume when the seal groove is discussed as a whole. For example, if the area of the rear region is larger than the area of the front region then the corresponding volume of the rear region will be larger than the volume of the front region. The area of the rear region and the front region may be substantially identical. The area of the rear region may be larger than the area of the front region. Preferably, the area of the rear region may be larger than the area of the front region.

The annular groove includes a seal. The seal has a height, an outer diameter, an inner diameter, and a width. The height of the seal may be tall enough so that upon inserting the piston into the bore, an interference fit is created between the piston and the seal so that fluid leakage out of the front opening is prevented. The height of the seal may be tall enough such that the seal extends out of the annular groove so that upon insertion of the piston into the bore, the seal contacts the piston and forms an interference fit. The seal includes an inner diameter and an outer diameter. The height of the seal is a function of diameter (i.e. half the difference between the outer diameter and the inner diameter). The inner diameter surface of the seal may be small enough so that the seal contacts the piston so that fluid cannot move past the seal. The inner diameter surface of the seal may contact a piston. The seal is fit against and around a diameter of a piston that is located in the caliper bore. The outer diameter of the seal may contact the bottom wall of the seal groove.

The width of the seal may be smaller than the seal groove width (i.e. the minimum axial distance between the front wall and the rear wall of the seal groove). Preferably, the seal will be wide enough so that fluid leakage is prevented. More preferably, prior to piston insertion, the seal width will be smaller than the groove width, and after piston insertion, the width of the seal may increase but may still be smaller than the width of the seal groove so that the seal may have room to swell as the temperature of the braking system increases due to use and/or twist within the seal groove. Preferably, the width of the seal even at high temperatures may be smaller than or about equal to the seal groove width. The width of an installed seal may be about 5 mm or less, preferably about 4 mm or less. The width of an installed seal may be about 1 mm or more, preferably about 2 mm or more, or more preferably about 3 mm or more (e.g. between about 3 mm to about 3.6 mm).

The seal may be made of any material that is resistant and inert to brake fluid. The seal may be made of any material that is stable over a wide temperature range. The seal may be made of any material that is not easily affected by piston slip. The seal may be made of any material that does not degrade with use. For example, the seal may be made of any material that does not begin to degrade from repeated contact with the front wall (i.e. nibbled away). The seal may be made of a polymeric material. Preferably, the seal may be made of an elastomeric material. More preferably, the seal may be made of: rubber (e.g. Ethylene Propylene Diene Monomer (EPDM)). The seal may be made of a resilient material so that the seal continues to resist fluid leakage after repeated brake applies (e.g. about 1,000 brake applies or more, about 10,000, brake applies or more, about 100,000 brake applies or more, or even about 1,000,000 brake applies or more). More preferably, the resilient seal will be located in a seal groove so that the seal resists brake fluid from leaking out of the front opening of the caliper bore.

The seal during a brake apply moves into contact with the front wall. The seal during a brake release moves towards the rear wall. The seal during a brake apply may twist on or about the projection toward and into contact with the front wall. The bottom portion of a seal may always be in contact with the front wall (i.e. during a brake apply, a brake release, brake off, any time therebetween, or a combination thereof). The top portion may twist away from the front wall during a brake release and twist towards and into contact with the front wall during a brake apply. The amount of the seal that twists may vary based upon the height of the seal. For example, a seal that is 2 mm in height may have a top portion of about 1 mm that twists; whereas, a seal that is 3 mm in height may have a top portion that is 2 mm that twists. The bottom portion may be about ⅛, about ¼, about ⅓, about ½, about ⅔, or even ¾ of the seal height from the bottom wall. The top portion may be about ⅛, about ¼, about ⅓, about ½, about ⅔, or even ¾ of the seal height from the piston. Preferably, the entire seal twists during a brake apply. For example, the entire seal twists towards the front wall during a brake apply, and the entire seal twists away from the front wall during a brake release. The seal during a brake release twists on the projection towards the rear wall due to the piston being forced back into the bore by the relaxation of the pads and caliper. The projection substantially maintains the position of the seal in the seal groove so that the seal does not retract the piston away from the brake pads, the rotor, or both. The projection allows the seal to twist towards the rear wall so that the load of the piston, in the apply direction, against the brake pad, rotor, or both on the seal in the apply direction is substantially reduced. The projection, the rear wall angle, or both may allow the seal to twist unobstructed in the retract direction so that the piston remains substantially in place and the assembly is substantially free of an air gap. For example, air gap may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. It is contemplated that any air gap that may exist while the vehicle is in motion will be due to disc thickness variation, wobble (i.e. lateral run-out or LRO) of the rotor, or a combination thereof.

The teachings herein provide for a seal groove that allows for reduced braking distance due to substantially reducing and/or eliminating air gap. The present teaching substantially reduce and/or eliminate air gap, thus, reducing the amount of time (i.e., running time) between a brake apply and a braking force being applied. For example, if a vehicle is traveling about 97 km/hr (i.e. about 60 mi/hr) and it takes 0.1 second longer for a braking force to begin slowing a vehicle versus the present teachings then the car would travel about 2.7 m (i.e. about 9 feet) before the braking force begins to slow the vehicle. The seal groove of the present teachings may reduce the amount of time before a braking force begins by about 0.001 seconds or more, about 0.005 seconds or more, about 0.01 seconds or more, preferably about 0.05 seconds or more, more preferably about 0.1 seconds or more, even more preferably about 0.15 seconds or more, or most preferably about 0.2 seconds or more. The seal groove of the present teachings may reduce the amount of time before a braking force begins by about 1 second or less, about 0.8 seconds or less, or about 0.5 seconds or less. The seal groove of the present teachings may reduce the amount of time before a braking force begins by between about 1 second and 0.001 seconds and preferably between about 0.3 and about 0.05 seconds. Thus, one skilled in the art would be able to calculate the reduced stopping distance based upon the reduction in time to begin a braking force and the velocity of the vehicle. For example, if the velocity is about 200 km/hr (i.e. about 124 mi/hr) and the reduced stopping time was about 0.15 seconds the stopping distance would be reduced by about 8.3 m (i.e. about 28 feet).

Figure 1:
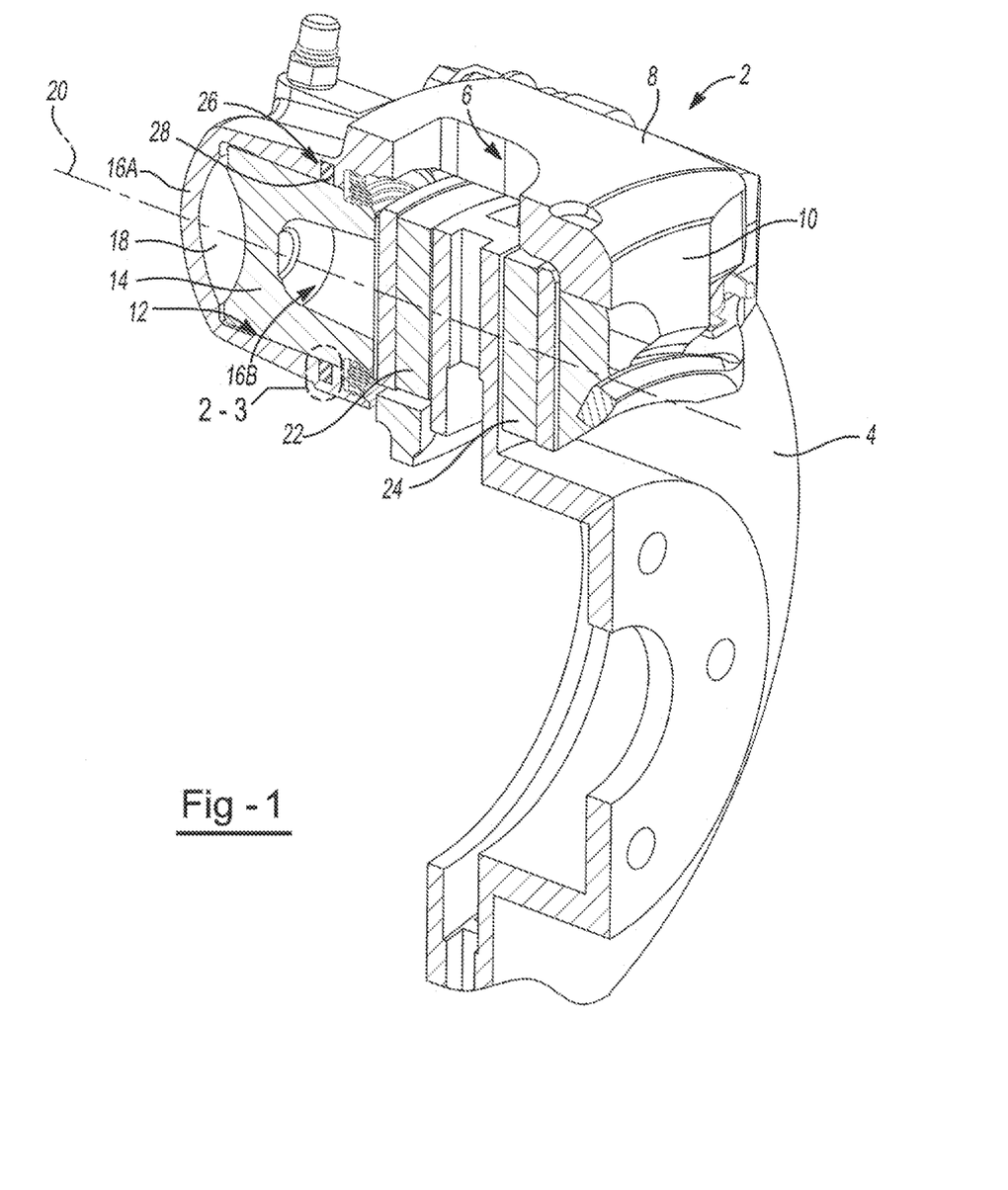
FIG. 1 illustrates an example of a braking device of the teachings herein.

FIG. 1 illustrates a brake assembly 2. The brake assembly includes a rotor 4 and a caliper 6. The caliper 6 further includes a bridge 8, fingers 10, and a piston bore 12 that houses a piston 14. The brake assembly 2 includes an outboard brake pad 24 and an inboard brake pad 22 located either side of the rotor 4. The piston bore 12 further includes a closed end 16A and an open end 16B. The closed end 16A includes brake fluid 18 so that during a brake apply the brake fluid 18 moves the piston 14 along a bore axis 20 and into contact with the inboard brake pad 22 so that the inboard brake pad 22 is moved toward the rotor 4 and the fingers 10 move the outboard brake pad 24 toward an opposing side of the rotor 4. The piston bore 12 includes a seal groove 26 and the seal groove has a seal 28 installed in the seal groove 26.

Figure 2:
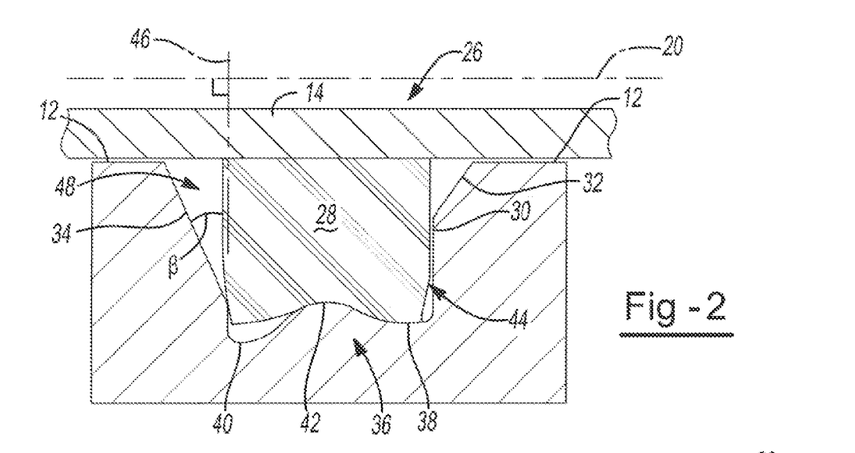
FIG. 2 illustrates a close-up cross-sectional view of one possible configuration of a seal groove of FIG. 1 with a seal installed in the seal groove.

FIG. 2 illustrates a close-up cross-sectional view of a seal groove 26 in the piston bore 12 and the seal groove 26 includes a seal 28 installed in the seal groove 26. The seal is illustrated in a neutral position (i.e., when the brake pads are not moving due to a brake apply or a brake retract). The seal groove 26 includes a front wall 30 with a chamfer 32, a rear wall 34, and a bottom wall 36. The rear wall as illustrated is generally linear in shape. The rear wall 34 forms an angle (β) with a line 46 perpendicular to a line representing and parallel with the bore axis 20. The angle (β) represents an open space 48 area created by the angle of the rear wall 34 from the line perpendicular to the bore axis 46. The bottom wall 36 includes a projection 42, a forward recessed region 38, and a rear recessed region 40. As illustrated the forward recessed region 38 is smaller than the rear recessed region 40 in both depth and area. The piston 14 as illustrated pushes the seal 28 against the projection 42 so that a middle portion of the seal 28 bulges 44 out as illustrated.

Figure 3:
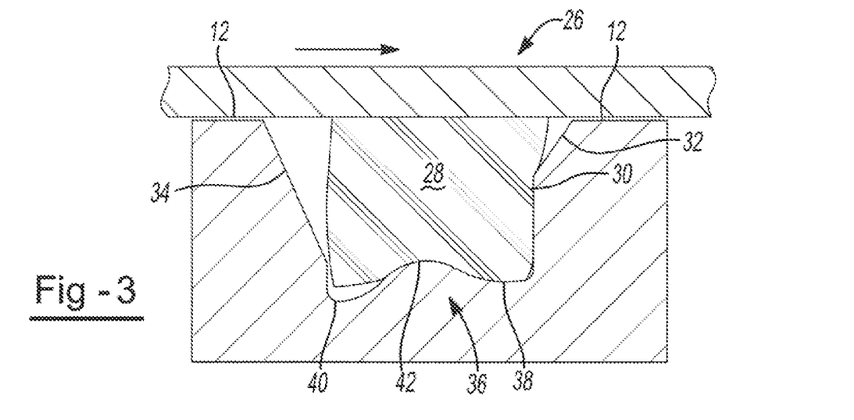
FIG. 3 illustrates a close-up cross-sectional view of another possible configuration of a seal groove of FIG. 1 during a brake apply.

FIG. 3 illustrates a close-up cross-sectional view of a seal groove during a low pressure or medium pressure brake apply as indicated by the arrow. The piston bore 12 includes a seal groove 26 and the seal groove 26 includes a seal 28. The seal groove includes a front wall 30 with a chamfer 32 and a rear wall 34 that is free of a chamfer. The seal 28 is twisted into the chamfer 32 by the piston 14 as the piston 14 slides towards the inboard brake pad (not shown). The seal groove further includes a bottom wall 36 connecting the front wall 30 and rear wall 34. The bottom wall 36 includes a projection 42, a forward recessed region 38, and a rear recessed region 40. As illustrated the forward recessed region 38 is smaller than the rear recessed region 40 in both depth and area.

Figure 4:
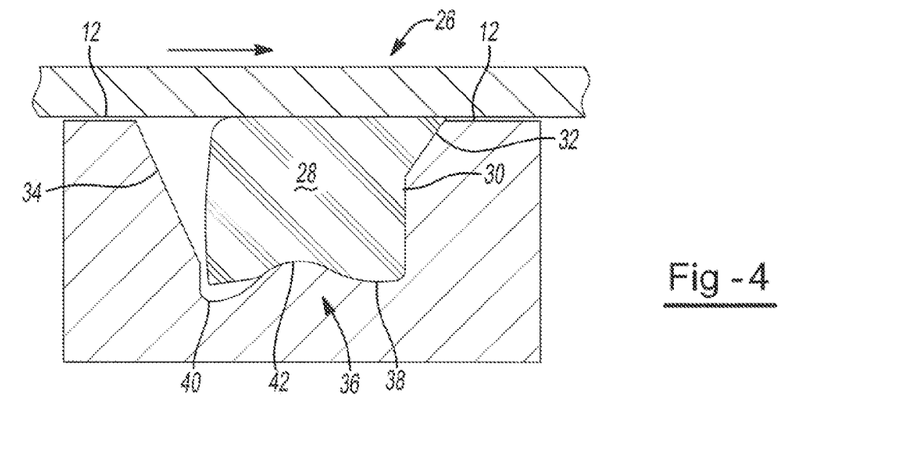
FIG. 4 illustrates a close-up cross-sectional view of another possible configuration of a seal groove of FIG. 1 during a high pressure brake apply.

FIG. 4 is a close-up cross-sectional view illustrating the twisting of the seal 28 during a high pressure brake apply. The arrow in FIG. 4 shows the direction of piston movement and seal twisting during a brake apply. The seal 28 twists on the projection 42 and completely into contact with the front wall 30 and into contact with a chamfer 32 in the front wall so that the seal 28 substantially contacts the entire chamfer 32. The seal 28 during a brake apply twists so that a portion of the seal moves down and into the forward recessed region 38.

Figure 5:
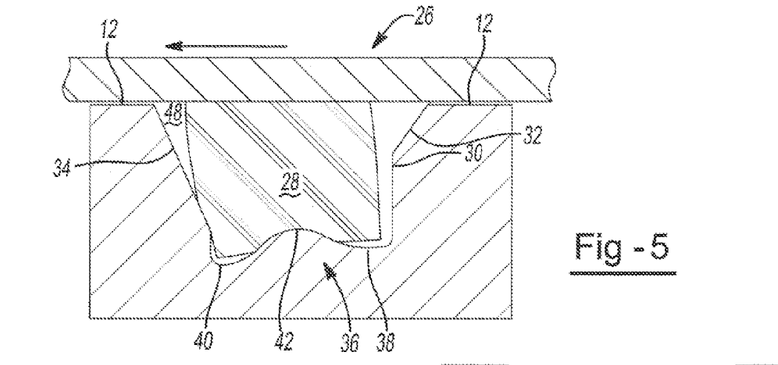
FIG. 5 illustrates a close-up cross-sectional view of one possible configuration of a seal groove of FIG. 1 during a brake retract and/or a brake release.

FIG. 5 is a close-up cross-sectional view illustrating the twist of the seal 28 during a brake retract and/or a brake release. The arrow in FIG. 5 shows the direction of piston movement and seal twist during a brake retract and/or a brake release. The open space 48 area created by the angle of the rear wall 34 relative to a line 46 perpendicular to the bore axis 20 as illustrated in FIG. 2 allows the seal to twist away from the front wall 30.

Figures 6, 7, 8:
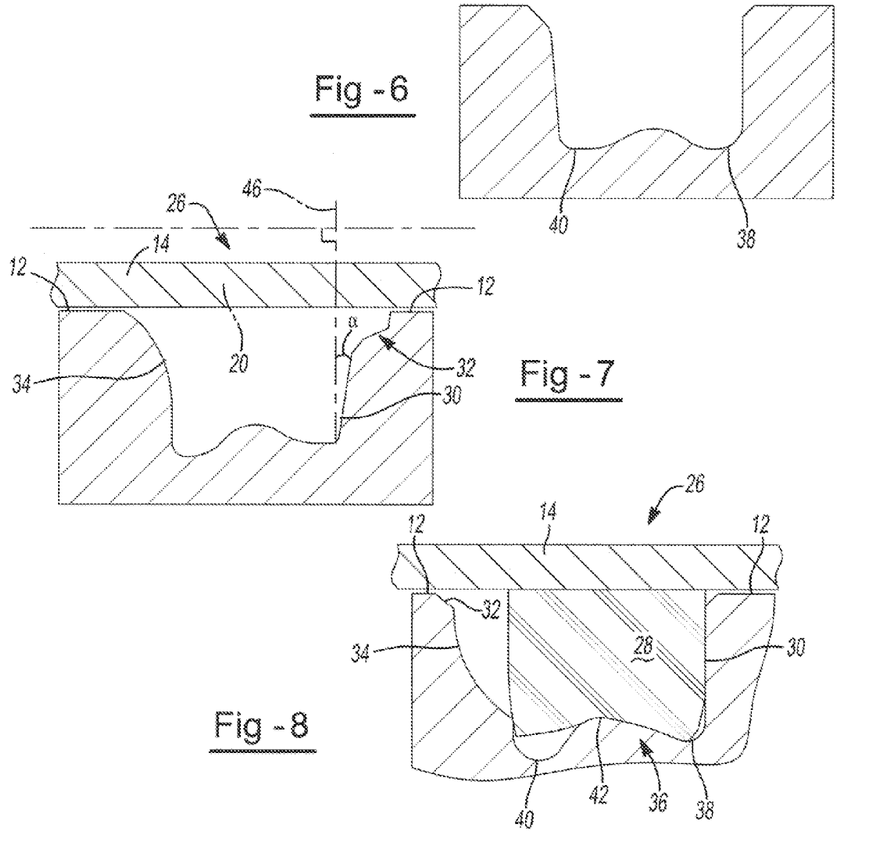
FIG. 6 illustrates a close-up cross-sectional view of another possible configuration for a bottom wall.
FIGS. 7 and 8 illustrate additional cross-sectional views of possible configurations for a rear wall, a front wall, and a bottom wall.

FIG. 6 is a close-up cross-sectional view illustrating the forward recessed region 38 and the rear recessed region 40 being substantially the same size in both depth and area.

FIGS. 7 and 8 illustrate close-up cross-sectional views illustrating some additional possible configurations of the seal groove 26 as taught herein. FIG. 7 illustrates a piston 14 with a bore axis 20 in the piston bore 12. A line 46 is perpendicular to a line representing and parallel to the bore axis 20, which forms an angle (α) with the front wall 30. The rear wall 34 forms a convex arc. The front wall of FIG. 7 includes a triple chamfer 32. FIG. 8 illustrates a rear wall 34 with a convex shape. FIG. 8 further illustrates an asymmetrical bottom wall 36 that includes an asymmetrical projection 42. The asymmetrical projection 42 includes a rear recessed region 40 sharply forming from the projection 42 and a forward recessed region 38 that with a slight slope from the projection 42. The forward wall 30 is substantially perpendicular with the bore axis (not shown). The rear wall 34 is an arcuate and includes a concave portion that extends away from the seal 28. The rear wall 34 includes a chamfer 32 that extends to the piston bore edge 12.

Figure 9:
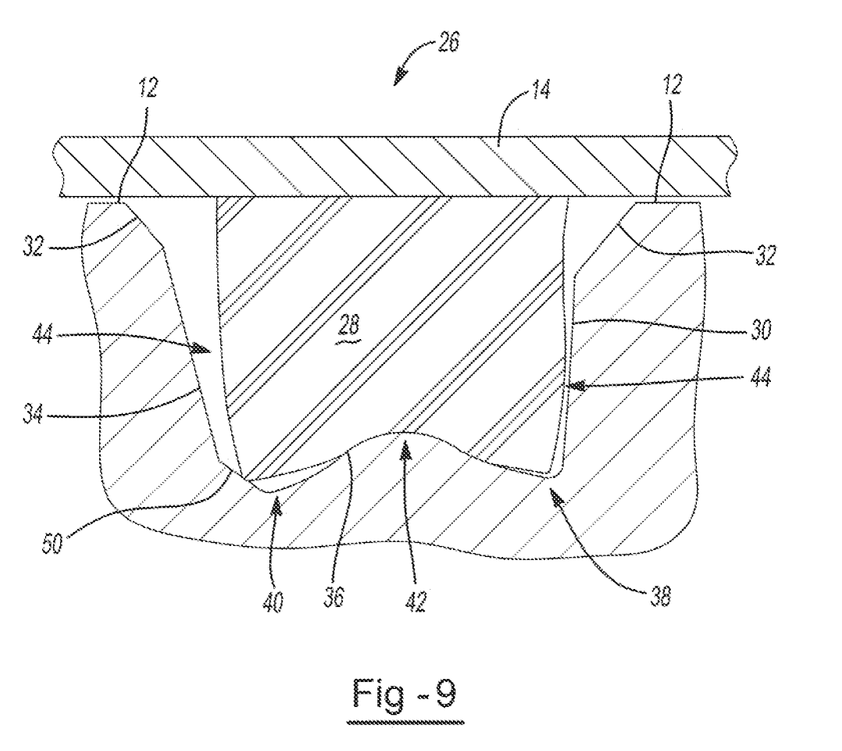
FIG. 9 illustrates a cross-sectional view of one possible seal groove that includes a ramp in a recessed region.

FIG. 9 illustrates a cross-sectional view of another possible configuration for the seal groove 26. The seal groove includes a seal 28 in the seal groove 26. The seal 28 is compressed between the piston 14 and the bottom wall 36 so that the sides of the seal are pushed out and form an arcuate shaped bulges 44. The rear wall 34 and the front wall 30 include chamfers 32 that extend from the respective wall to the piston bore 12. The bottom wall 36 includes a projection 42 located between the forward recessed region 38 and the rearward recessed region 40. The rearward recessed region includes a ramp 50. The ramp 50 is a linear portion that connects the bottom wall 36 to the rear wall 34. A corner of the seal 28 contacts the ramp 50. The ramp 50 creates a single point of contact with the seal 28 so that the seal 28 easily twists away from the front wall upon a brake release and/or during a brake retract.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 9, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A caliper comprising:
   a) a piston bore having a piston bore axis and a piston bore surface;
   b) a piston in the piston bore;
   c) an inboard brake pad and an outboard brake pad; and
   d) a seal groove, having a seal, located in the piston bore proximate to an open end of the piston bore, the seal groove comprising:
      i) a bottom wall;
      ii) a front wall extending between the piston bore surface and the bottom wall;
      iii) a rear wall extending between the piston bore surface and the bottom wall at an angle of about 5 degrees or greater and about 60 degrees or less with a line perpendicular to the piston bore axis;
      iv) a projection in a central region of the bottom wall suitable for allowing twisting of the seal during a brake release, wherein the projection is generally arcuate and convex in shape;
      v) a forward recessed region in the bottom wall on a side of the projection located proximate to the front wall, wherein the front wall and the bottom wall connect in the forward recessed region; and
      vi) a rearward recessed region in the bottom wall on a side of the projection located proximate to the rear wall, wherein the rear wall and the bottom wall connect in the rearward recessed region;
   wherein the bottom wall spans between and connects the front wall to the rear wall;
   wherein the rear wall, beginning proximate to the bottom wall, continuously diverges away from the front wall as the rear wall extends away from the bottom wall and towards the piston bore surface;
   wherein the seal, in a neutral position, has a front side that extends away from the piston bore axis and into the forward recessed region and a rear side that extends down and into the rearward recessed region and a gap exists between the rear side of the seal and the rearward recessed region;
   wherein the seal, during a brake apply, is rotated about the projection so that the front side of the seal is rotated into contact with the bottom wall and front wall in the forward recessed region and the rear side is rotated away from the rear wall; and wherein the seal, during a brake retract, is rotated about the projection so that the front side of the seal is rotated away from the front wall and out of contact with the bottom wall and the rear side is rotated towards the rear wall and further into the rearward recessed region when compared to the neutral position and during a brake apply so that the gap between the rear side of the seal and the rearward recessed region still exists but is reduced in size.

2. The caliper of claim 1, wherein the rearward recessed region and the forward recessed region are generally arcuate and concave.

3. The caliper of claim 2, wherein the piston bore has a cross-section that lies on a plane that extends along the piston bore axis, and
wherein the rearward recessed region is a space bounded between the rear wall and a side of the projection located proximate to the rear wall, and the forward recessed region is a space bounded between the front wall and a side of the projection located proximate to the front wall; and
wherein the size of the rearward recessed region is larger than the space of the forward recessed region when measuring the cross-section of the seal groove.

4. The caliper of claim 2, wherein the piston bore has a cross-section that lies on a plane that extends along the piston bore axis, and
wherein a distance from a top of the seal groove to the bottom wall located in the forward recessed region is smaller than a distance from the top of the seal groove to the bottom wall located in the rearward recessed region- when measuring the cross-section of the seal groove.

5. The caliper of claim 1, wherein the rear wall forms an angle between about 10 degrees and about 30 degrees measured from the rear wall to the line perpendicular to the piston bore axis.

6. The caliper of claim 1, wherein the front wall includes at least one chamfer.

7. The caliper of claim 6, further including the seal installed in the seal groove, and wherein the rear wall includes at least one chamfer.

8. The caliper of claim 7, wherein the piston bore has a cross-section that lies on a plane that extends along the piston bore axis, and the seal is located widthwise on a central portion of the projection, in the cross-section, so that the seal sits on top of a peak of the projection when the projection is bisected through a center of the projection and the seal can twist about the peak during a brake apply, a brake off, or any position therebetween.

9. The caliper of claim 7, wherein the seal contacts to the front wall, and optionally a chamfer during a brake apply.

10. The caliper of claim 1, wherein at least a portion of the seal is angled away from the front wall during a brake off position so that the seal, due to twisting, applies a force on a piston in a brake apply direction.

11. A disc brake system comprising:
a) the inboard brake pad and the outboard brake pad;
b) a rotor located between the inboard brake pad and the outboard brake pad;
c) the caliper of claim 1; and
a piston located in the piston bore,
wherein an inner diameter of the seal is in contact with the piston, and the piston remains substantially in contact with the inboard brake pad during the brake off position; and
wherein, during running, the inboard brake pad and the outboard brake pad are substantially free of the air gap between a face of the inboard brake pad and a face of the outboard brake pad minus a thickness of the rotor, when the inboard brake pad contacts the piston and the outboard brake pad contacts fingers of the caliper.

12. The disc brake of claim 11, wherein a top half of the seal, adjacent to the piston, moves in a retract direction during a brake retract so that the seal is twisted about the projection in the seal groove away from the front wall.

13. The caliper of claim 2, wherein the projection is located between the generally arcuate and concave forward recessed region and the generally arcuate and concave rearward recessed region;
wherein the front wall and the rear wall are not parallel;
wherein the projection is free of any linear portions;
wherein the projection is shaped like a hump;
wherein the projection is configured so that the entire seal twists on the projection towards the front wall during a brake apply and towards the rear wall during a brake retract; and
wherein a line tangent to a side of the projection proximate to the front wall has a slope from about 15 to about 0.1, and a line tangent to a side of the projection proximate to the rear wall has a slope from about 15 to about 01.

14. A caliper comprising:
a) a piston bore having a piston bore axis and a piston bore surface; and
b) a seal groove located in the piston bore proximate to an open end of the piston bore, the seal groove comprising:
i) a front wall;
ii) a rear wall including a chamfer; and
iii) a bottom wall forming a connection with the front wall and a connection with the rear wall and spanning between the front wall and the rear wall; the bottom wall comprising:
(1) a generally arcuate and convex projection extending towards the piston bore surface from the bottom wall, the projection being located in a central region of the bottom wall;
(2) a forward recessed region forming a concave recess in the bottom wall on a side of the projection located proximate to the front wall, the forward recessed region being generally arcuate, wherein the front wall and the bottom wall connect in the forward recessed region forming a radius between the front wall and the bottom wall;
(3) a rearward recessed region forming a concave recess in the bottom wall on a side of the projection located proximate the rear wall, the rearward recessed region being generally arcuate, wherein the rear wall and the bottom wall connect in the rearward recessed region forming a radius between the rear wall and the bottom wall;
wherein the projection forms a bell curve shape so that a seal can rotate about the projection during a brake release, a brake apply, or both;
wherein the rear wall, beginning at the connection with the bottom wall, continuously diverges away from the front wall as the rear wall extends away from the bottom wall and towards the piston bore surface;
wherein the piston bore has a cross-section that lies on a plane that extends along the piston bore axis, and in the cross-section the rear wall forms an angle of about 5 degrees or greater with a line perpendicular to the piston bore axis and an angle of about 40 degrees or less with the line perpendicular to the piston bore axis;
wherein the front wall, beginning at the connection with the bottom wall, continuously diverges away from the rear wall as the front wall extends away from the bottom wall and towards the piston bore surface, wherein, in the cross-section, the front wall forms an angle of about 1 degree or more with the line perpendicular to the piston bore axis and an angle of about 10 degrees or less with the line perpendicular to the piston bore axis;

wherein the seal, in a neutral position, has a front side that extends into the forward recessed and into contact with the bottom wall in the forward recessed region and a rear side that extends down and into the rearward recessed region so that a gap is present between the rear side of the seal and the rearward recessed region;

wherein the seal, during a brake apply, is rotated about the projection so that the front side of the seal is rotated into contact with both the bottom wall and front wall in the forward recessed region and the rear side is rotated away from the rear wall; and wherein the seal, during a brake retract, is rotated about the projection so that the front side of the seal is rotated away from the front wall and out of contact with the bottom wall and the rear side is rotated towards the rear wall and to a further depth in the rearward recessed region when compared to the neutral position and during a brake apply so that the gap during the brake retract still exists but is smaller than the gap when in the neutral position.

15. The caliper of claim 14, wherein the forward recessed region connects the front wall to the bottom wall and the forward recessed region includes a radius spanning between the front wall and the bottom wall;

wherein the rear wall and the bottom wall have an arcuate connection in the rear recessed region so that the seal extends into the rear recessed region during a brake apply, a brake retract, a brake release, or a combination thereof, and so that the seal twists away from the front wall during a brake release.

16. The caliper of claim 1, wherein the projection is free of sharp transitions, angles, edges, or a combination thereof.

17. The caliper of claim 1, wherein a depth of the rear recessed region is lower than a highest point of the projection when measuring from the piston, the piston bore axis, or both.

18. The caliper of claim 1, wherein a depth of the forward recessed region is lower than a highest point of the projection when measuring from the piston, the piston bore axis, or both.

19. The caliper of claim 1, wherein a radius is formed in the rearward recessed region where the front wall and the bottom wall connect, and a radius is formed in the forward recessed region where the rear wall and the bottom wall connect.

* * * * *